F. L. KINSEY.

GRINDING AND DISINTEGRATING MACHINE.

APPLICATION FILED NOV. 4, 1912.

Reissued Oct. 27, 1914.

13,820.

3 SHEETS—SHEET 1.

Inventor:

Fred rick L. Kinsey.

Witnesses

G. M. Fowler Jr.

N. E. Brockman.

By James L. Hopkins,

Attorney

F. L. KINSEY.

GRINDING AND DISINTEGRATING MACHINE.

APPLICATION FILED NOV. 4, 1912.

Reissued Oct. 27, 1914.

13,820

3 SHEETS—SHEET 2.

Witnesses

J. M. Fowler Jr.

N. E. Brockman.

Inventor

Fredrick L. Kinsey

By James L. Hopkins,

Attorney

F. L. KINSEY.

GRINDING AND DISINTEGRATING MACHINE.

APPLICATION FILED NOV. 4, 1912.

Reissued Oct. 27, 1914.

13,820.

3 SHEETS—SHEET 3.

Inventor

Frederick L. Kinsey.

Witnesses

J. M. Fowler Jr.

N. E. Brockman.

By James L. Hopkins

Attorney

UNITED STATES PATENT OFFICE.

FREDRICK L. KINSEY, OF BUFFALO, NEW YORK, ASSIGNOR, BY MESNE ASSIGNMENTS, TO WILLIAMS PATENT CRUSHER AND PULVERIZER COMPANY, OF ST. LOUIS, MISSOURI, A CORPORATION OF MISSOURI.

GRINDING AND DISINTEGRATING MACHINE.

13,820. Specification of Reissued Letters Patent. Reissued Oct. 27, 1914.

Original No. 978,034, dated December 6, 1910, Serial No. 554,485. Application for reissue filed November 4, 1912. Serial No. 729,507.

*To all whom it may concern:*

Be it known that I, FREDRICK L. KINSEY, a citizen of the United States, residing at Buffalo, in the county of Erie and State of New York, have invented certain new and useful Improvements in Grinding and Disintegrating Machines; and I do hereby declare the following to be a full, clear, and exact description of my invention, such as will enable others skilled in the art to which it appertains to make and use the same, reference being had to the accompanying drawings, and to the figures of reference marked thereon, which form part of this specification.

Like figures of reference refer to like parts.

My invention relates to improvements in grinding and disintegrating machinery of the rotary type; especially to means for governing the amount of space between the respective grinding surfaces and to means of governing the discharge of the disintegrated product.

The objects of my invention are to provide adjustable and positive means for grind- and disintegrating materials, as well as to govern the discharge of the said materials from between the grinding surfaces.

I desire also to so construct and arrange the various members of my device that they can, with ordinary mechanical skill, be easily disassembled, repaired, or replaced, reassembled and adjusted in a convenient manner, which shall lend to practical utility in its continuous service and as an article of manufacture.

To attain the above objects, I provide certain details of construction, which are illustrated in the accompanying drawings and are hereinafter described. Their coöperation is explained and what I claim is set forth.

Figure 1:
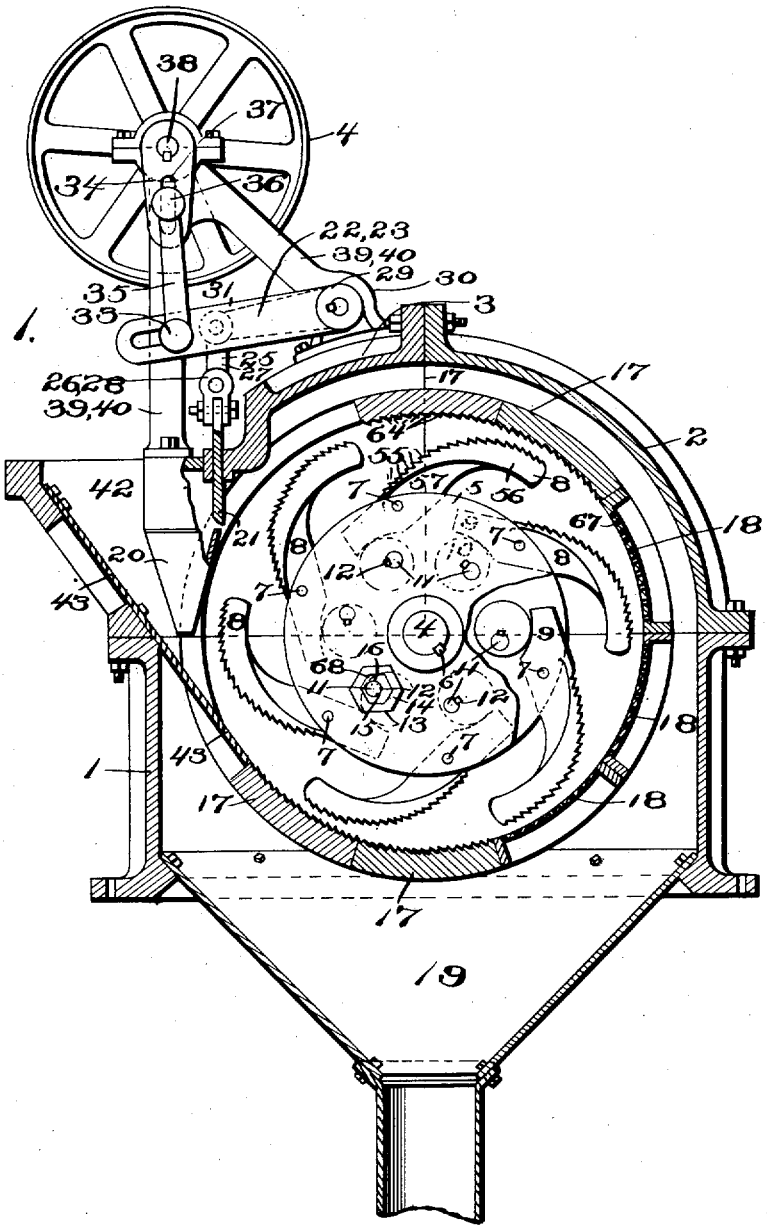
Figure 2:
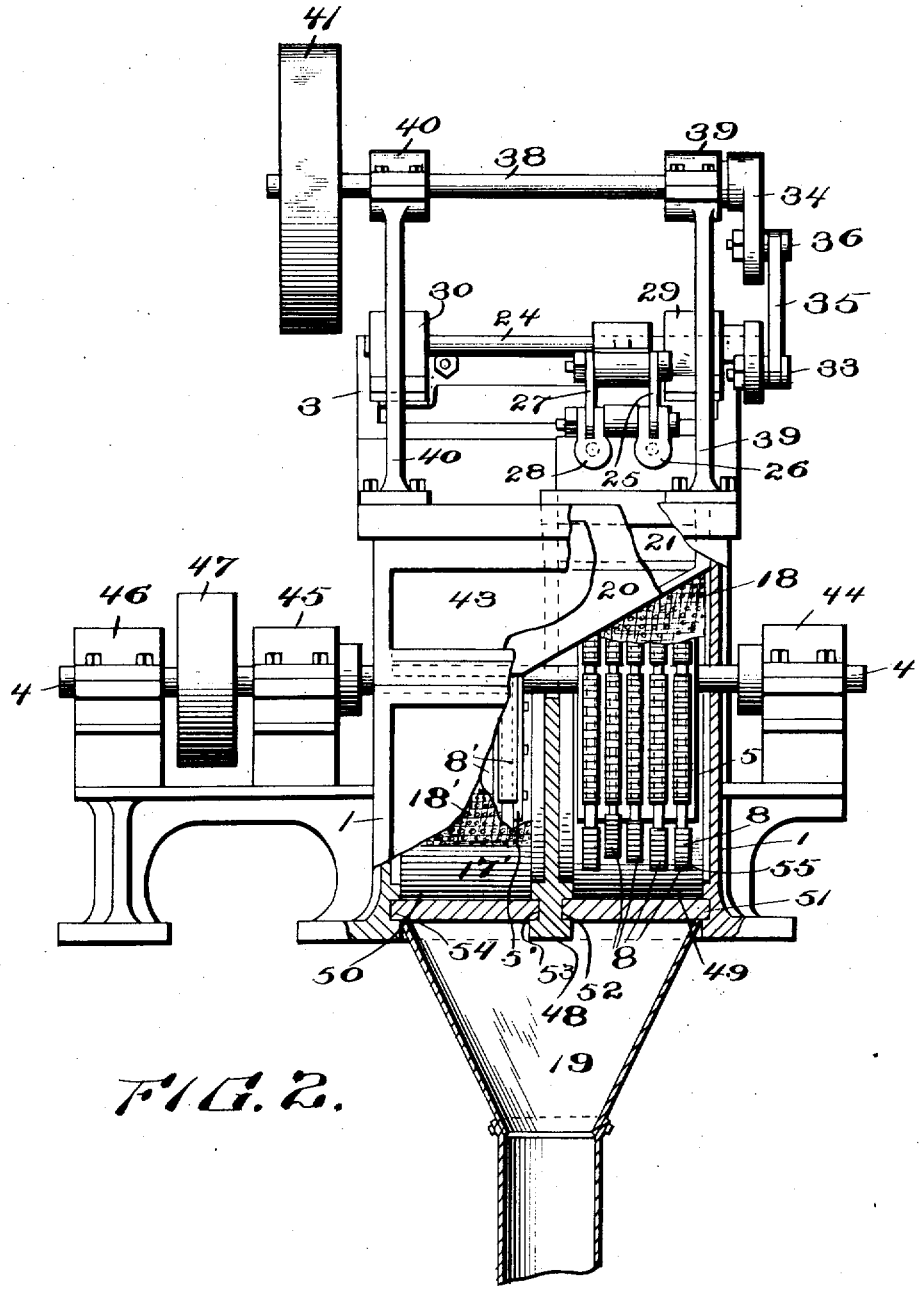
Figure 9:
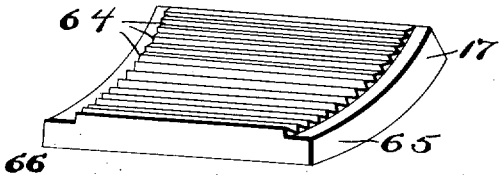
Figure 10:
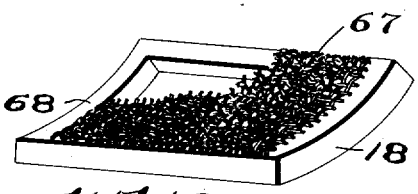
Figure 3:
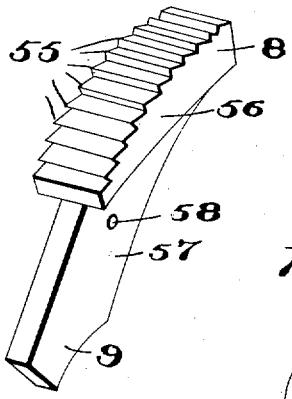
Figure 4:
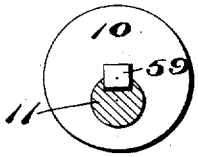
Figure 5:
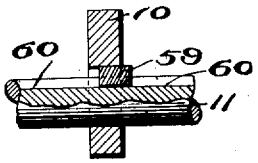
Figure 6:
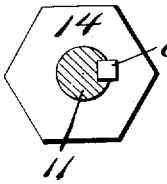
Figure 7:
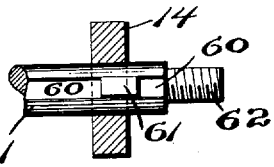
Figure 8:
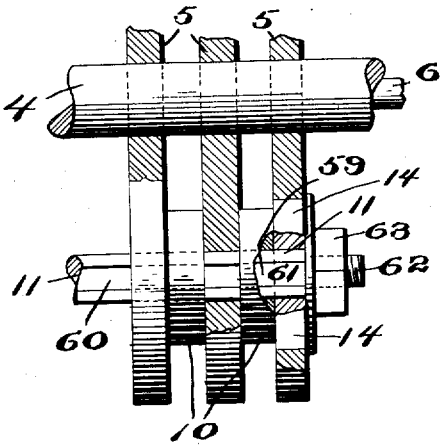

In the figures, I have shown a vertical end section of my device assembled in Figure 1. In Fig. 2, I have shown a front elevation partially broken away to illustrate the internal arrangement of the parts. Fig. 3 is a perspective view of one of the grinding shoes composing the rotary grinding surface. Fig. 4 is an elevation of one of the cams, showing in section the feathered shaft upon which it is mounted. Fig. 5 is a transverse sectional elevation of the cam and shaft shown in Fig. 4. Fig. 6 is an elevation of one of the cam-setting devices with a section of the same feathered shaft as is shown in Figs. 4 and 5. Fig. 7 is a transverse sectional elevation of the cam-setting device, together with a portion of the feathered shaft shown in Fig. 6. Fig. 8 is a broken elevation of an assemblage of supporting disks, cams, feathered shaft, cam-setting device and main shaft. Fig. 9 is a perspective view of a section of the stationary concave grinding surface of my device. Fig. 10 is a perspective view of a form of section, circumferentially continuous with the concave stationary grinding surface, and which I preferably use to allow the disintegrated product to pass through.

The outer casing of my device is composed of three parts fastened together. The lower or larger part shown in Fig. 1 is marked 1. The sections 2 and 3 rest upon section 1 and are fastened thereon, as well as together. The main shaft 4 passes through the center of the machine and has mounted upon it a series of supporting disks 5, keyed to the shaft 4 by the key 6. Between the respective disks and fulcrumed upon the rods 7 are the grinding shoes 8. Engaging the inner ends 9 of the respective shoes 8 are the cams 10, which lie between the respective disks 5. These cams 10 are locked upon the feathered shafts 11 by the keys 12. Mounted on the respective feathered shafts 11 and contained within hexagonal recesses 13, in the outer one of the disks 5, are the respective cam-setting devices 14, which are concentric with each of the feathered shafts 11, and are keyed thereon by the keys 15. The nut 16 secures the cam-setting device 14 upon the shaft 11. The rods 7 and the shafts 11 are respectively secured at each end and act to hold all the parts supported thereon together. Surrounding the arrangement of disks 5, cams 10 and shoes 8 are the sections of cylindrical partition, which are of two kinds, one marked 17, being adapted for grinding and the other marked 18 being adapted to allow the finer particles of the disintegrated product to pass through the same and to gravitate into the hopper 19. Mounted within the section 3 of the casing, is the inclined trough 20. The upper ends and sides, as well as the top of this trough 20 are inclosed; the inner side is hung from an oscillating mechanism mounted on the casing 3 and constitutes a valve 21, whereby a limited amount of the disintegrated product is allowed to enter the trough 20. The oscillating mechanism above the valve 21 is made up of the following parts; rocking arms 22 and 23, which are mounted on a shaft 24 connect with the valve 21 by the links 25, 26, 27, 28. The shaft 24 is journaled in the bearings 29 and 30 upon the casing 3. Mounted upon the shaft 24 is the oscillating lever 31, the outer end of which is provided with a slot 32, within which slot is adjustably secured the pin 33. The lever 31 is actuated by the crank 34 through the means of the connecting rod 35 journaled on the wrist pin 36 and the pin 33. A radial slot 37 is provided near the outer end of the crank 34, within which is adjustably secured the wrist pin 36. The shaft 38 is journaled in the standards 39 and 40, mounted upon the casing section 3. At one end of this shaft 38 is secured the crank 34 while near the other end is mounted the pulley 41. Attached to the casing section 3 and forming therewith the inlet hopper 42 is the plate 43.

In Fig. 2, the shaft 4 is journaled in the bearings 44, 45, and 46. Between the bearings 45 and 46 and secured to the shaft 4, is the pulley 47. Centrally disposed, transverse to the shaft 4, is a partition wall 48, which divides the inner space within the casing into two similarly constructed compartments, 49 and 50, within each of which, mounted upon the shaft 4, is a complete set of disks 5, 5′, cams 10, 10′, cam-setting devices 14, 14′ and similar attachments thereto as described above in connection with Fig. 1. The lower inner open end of the trough 20 serves as an inlet hopper to the compartment 50, near the pulley 47. The annular recesses 51, 52, 53 and 54 are all concentric with the shaft 4. Within the recesses 51 and 52 are supported the sections 17 and 18 of the cylindrical partition within compartment 49 and within recesses 53 and 54 are supported the sections 17′ and 18′ of a similar cylindrical partition within compartment 50. These sections of said cylindrical partitions are adapted to fit within the said respective annular recesses and to be adjustably supported therein in any desired combination of the said sections about and concentarate with the main shaft 4, and the rotating grinding parts thereon.

In Fig. 3, I have shown transverse milled teeth 55, 55 on the outer curved part of the grinding shoe. This curved part is thickened below as at 56 and is integral with the arm 57. A hole 58 is provided in the arm 57 adapted in relative position and size to receive a rod 7, as shown in Fig. 1. The lower end 9 of the arm 57 is concave and adapted to engage the cam 10 of Fig. 1 when in position between the disks 5, 5.

In Fig. 4 is shown one of the cams 10 of Fig. 1, keyed upon a section of a feathered shaft 11 by the key 59.

Fig. 5 shows a transverse section of the cam 10 with the key 59 partially in position in the keyway 60 of a feathered shaft 11.

In Fig. 6, the hexagonal cam-setting device 14 is shown keyed to the shaft 11 by the key 61. A transverse section of the same cam-setting device 14 mounted on the shaft 11 and the key 61 is shown partially in position along the keyway 60 in the shaft 11; the end 62 being threaded to receive a nut.

In Fig. 8 is shown three of the disks 5 mounted upon the shaft 4, together with the cams 10, the cam-setting device 14, the feathered shaft 11 and the nut 63.

In the perspective view of a section of the cylindrical partition with a surface as illustrated in Fig. 9, the transverse teeth 64, 64 are shown milled in the concave face of the said section. The curved ends of the sections 65 and 66 are adapted to fit within the annular recesses marked 51, 52, 53, 54, in the flat walls of the casing.

I have shown in Fig. 10 a square wire screen 66 mounted on the concave side of a frame section 67 and secured thereto. The said frame section being adapted on the curved ends to fit within the said annular recesses.

Previous to operating my device, it is desirable to set the grinding shoes in governing the space between the rotating, grinding surfaces and inner surface of said cylindrical partition and to arrange the concave sections 17 and 18 within the annular recesses. Each group of grinding shoes, fulcrumed on the rods 7, between the disks 5, is set with reference to the stationary grinding surface of said cylindrical partition by partially rotating the feathered shaft 11 of said group, having previously withdrawn the cam-setting device from its hexagonal socket and placing the said device within the said socket, after attaining the desired position of the cams, then securing all parts together upon the shaft 11, by the nut 63, there being a head on the other end of each shaft 11. The cam-setting device being also keyed upon the feathered shaft 11, turns with this shaft 11 and when reinserted within the hexagonal socket is then in a new position within the said socket after the shaft 11 has been turned as just described. Instead of using the hexagonal form for the external shape of the cam-setting device, any other regular form concentric with the shaft 11 may be used, providing said form has equal sides and providing the corresponding socket within the end disk is similar in form and size to properly engage the said cam-setting device. The greater the number of equal sides used in said device, the greater will be the variety of positions attainable when setting the grinding shoes. I have found it desirable to relatively arrange the sections 17 and 18 around the annular recesses to attain various results in the disintegrated product. The design I have here shown and adopted in connection with the annular recesses gives freedom in quickly interchanging the said sections. The section marked 68 and shown in perspective in Fig. 10, being preferably woven of square wire, presents a rough concave surface to assist in disintegrating the materials within, at the same time allowing the finer particles to pass through and reach the hopper.

In operation the material to be disintegrated is fed into the feed hopper 42 and finds its way between the grinding shoes 8 and the concave grinding surface 64, and is partially disintegrated, as it moves in the direction of the grinding shoes. Continuing over the open section 18 where the rough surface 67 of the section 18 assists in cooperation with the grinding shoes 8 in further disintegrating the material within. The finer particles find their way through this open section and the coarser are carried on to be reground on other grinding sections of said cylindrical partition within the annular recess or are carried around and ground again and again, the finer particles of material finding their way through the open sections after they are formed.

Auxiliary grinding is accomplished by allowing some of the material to pass into the trough 20 and down into the adjoining grinding compartment 50, where the process is carried on in a manner similar and with similar means to that just described for the initial grinding chamber 49. The oscillation of the valve, in amplitude and period of vibration, forms a positive means of governing the amount of material found desirable to pass into the auxiliary grinding chamber 50. Any multiplicity of auxiliary grinding chambers in addition to the one shown and described, can be arranged along the main shaft 4 to afford any desired result in the disintegrating of materials, and the material can be passed in succession from one to the next chamber as is done from chamber 49 to 50.

I am aware that it has been common practice in grinding machinery in which knives or beaters are employed, to so mount the knife or beater on a pivotal support carried between disks that their ends extend to or near the surface against which the work rests, and that when the disks are revolved the knife or beater is held in radial position by centrifugal force, and I disclaim said mechanical construction. My invention employs grinding shoes 8 so mounted that their mass, when operated on by centrifugal force, impacts upon the material being ground or disintegrated with a degree of resiliency and so mounted that their mass can not be thrown into radial alinement with the axes of the supporting disks 5; the weight of the shoes 8 is therefore thrown, by centrifugal force, not upon their supports, but, upon the material constituting the work of the machine, and therefore not upon the rod 7 or cam 10. In the machines of the prior art referred to in this disclaimer, the knives or hammers cut, or break, or beat the material with their front faces, as they are revolved, held in radial position by centrifugal force with the weight of the cutting or beating tool entirely upon the rod or pin upon which it is pivotally mounted; in my present invention the shoe 8 is dragged behind its rod 7 with its rearwardly curved grinding face, roughened by the milled teeth 55, 55 or other suitable means, thrown outwardly by centrifugal force, working against the curved abrasive inner face of the inclosing cylindrical receptacle, formed of sections 17 and 18 as hereinbefore described. The material being disintegrated or ground is thus dragged by the shoe 8 against the faces of the sections 17 and 18, and at the same time is subjected to the weight of the shoe 8 as the same is forced outwardly by centrifugal force, within the limit of movement defined for the shoe 8 by the adjustment of the cam 10. At the same time, the mounting of the shoe 8 is such that it will yield and be depressed by an infrangible obstruction, accidentally fed to the machine, such as an iron bolt, which would otherwise be likely to break and destroy the shoe 8, or rupture the cylinder, and put the machine out of service.

It will be understood that the foregoing description of the function and mode of operation of the shoes 8 applies to the machine when in operation upon material, and while the material is being properly fed to the machine by one skilled in the operating of such machinery. If the disks 5 are revolved without material being fed, the weight of the shoe is divided between the rod 7 and the cam 10, and this condition continues under the light feeding of material. But when material is fed at a rate approximating the machine's capacity the outward throw of the mass of the shoe 8 under centrifugal force, impacts resiliently upon the mass of the material, with the result of securing a high degree of speed in grinding, and consequently in output of work, over the machines of the prior art above referred to.

Having thus described my invention, I claim:

1. An apparatus for grinding and disintegrating materials, consisting of a sectional casing having two parallel walls and an annular recess on the inner side of each said walls, a shaft transverse to said walls, within said casing and situated centrally to each of said annular recesses, means for driving said shaft, an internal sectional cylindrical partition, concentric with said shaft, said partition being composed of two kinds of adjoining sections having their curved sides adapted to be mounted within the said annular recesses, one kind of said sections being adapted to grinding, one kind of said sections being adapted to pass therethrough particles of the disintegrated product, grinding shoes fulcrumed on supporting means concentric with and mounted upon said shaft within said partition, means within the said supporting means adapted to engage the inner ends of the grinding shoes to limit the outward movement of said shoes with reference to the inner surface of said partition and adapted to be adjustably fixed upon the said supporting means, an inlet hopper leading within the said partition, and means adjoining said partition adapted adjustably to withdraw part of the insufficiently disintegrated material from within the said partition and a collecting hopper connected with the said casing and adapted to collect the disintegrated product which has passed through the said partition, all combined and operated as set forth.

2. In a disintegrating machine, a casing having parallel walls, a shaft passing through said walls, means for rotating said shaft, an internal cylindrical partition composed of two kinds of sections resting within annular grooves in said walls and concentric with said shaft, one kind of said sections having each a fluted concave solid grinding surface, assembled with another kind of said sections having each a semi-grinding sieve-like concave surface, a series of parallel disks within said casing, and positioned upon said shaft, a plurality of individual fluted edged grinding surfaces integral with arms and symmetrically fulcrumed in groups upon said disks and adapted to cooperate with said grinding and semi-grinding sections to disintegrate material fed therebetween, said individual grinding surfaces being curved and divergent to said sections, means upon said disks contacting the otherwise free inner ends of said arms for adjustably governing the outward movement of said individual surfaces, and means for feeding material to the device.

3. In a disintegrating machine, a casing having parallel walls, a shaft passing through said walls, means for rotating said shaft, an internal cylindrical partition composed of sections resting within annular grooves in said walls and concentric with said shaft, one kind of said sections having each a fluted edged concave grinding surface assembled with another kind of said sections having each a semi-grinding sieve-like concave surface, a series of parallel disks within said casing positioned upon said shaft, a plurality of individual fluted edged grinding surfaces integral with arms and symmetrically fulcrumed in groups upon said disks and adapted to adjustably coöperate with said grinding and semi-grinding sections to disintegrate material fed therebetween, said individual grinding surfaces being curved and divergent to said sections, means upon said disks contacting the inner ends of said arms for adjustably governing the outward movement of said individual surfaces, and means for feeding to the device the material to be disintegrated, means for governing the discharge of the insufficiently disintegrated material from within the said partition.

4. In a disintegrating machine, the combination with a casing, of a rotating element therein, a cylindrical partition within said casing concentric with said rotating element, abrasive means upon the concave surface of said partition, longitudinal rows of fulcrumed arms pivoted upon said rotating element, integral abrasive means having surface extension upon the outer ends of said arms, said last named means being curved divergent to said partition, and means upon the said rotating element in free contact with the inner ends of said fulcrumed arms and adapted to adjustably position the said abrasive means, integral with said arms, relative to the abrasive surface of said partition.

5. In a disintegrating machine, a casing, a curved partition upon and within said casing, a shaft journaled for rotation therein, disks adjustably fixed upon said shaft within said casing, said disks being provided with two series of holes, a set of rods fastened within each series of said holes, a series of sets of devices fulcrumed upon one set of said rods, said devices having their outer ends formed into an abrasive curved surface divergent to said curved partition, cams keyed upon the other set of said rods and between said disks, adapted to contact the otherwise free inner ends of said devices, to limit the outward movement of said devices, means for fixing the angular position of said cams upon the said last mentioned rods upon the said disk.

6. A disintegrating machine, provided with an internal abrasive cylindrical partition, a rotating element therein, a plurality of curved sharp fluted devices adjustably positioned upon said rotating element, and having the curved fluted surface divergent to said partition, adapting the sharp fluted surfaces of said devices to coöperate with said abrasive surface of said partition at a fixed distance.

7. In a disintegrating machine, two or more casings adjoining one another, each of said casings having parallel walls, inclosing a disintegrating chamber, a shaft passing through said walls and journaled for rotation within said casings, means within each of said casings upon said shaft coöperating respectively with means within each of said casings for disintegrating materials, a conveyer connecting two adjoining disintegrating chambers, an adjustably positioned oscillating valve adjoining the space between the last two named means and adapted to limit the discharge of material from said space into said conveyer.

8. In a disintegrating machine, a casing, a cylindrical partition within said casing, having parts of its concave face adapted for grinding and the other parts of the same adapted as a sieve, abrasive means supported upon said rotating element adapted to coöperate with the grinding face of said partition, cams keyed to a feathered shaft upon said rotating means adapted to freely contact the inner ends of said abrasive means and to limit the outward movement of said abrasive means when acted upon by centrifugal action, a cam-setting device keyed to said feathered shaft and adapted to engage a recess in said rotating element, in a manner to adjustably secure the said cams against any angular movement upon said feathered shaft.

9. In a disintegrating machine, a casing having parallel walls, a shaft passing through said walls, means for rotating said shaft, an internal cylindrical partition composed of two kinds of sections resting within annular grooves in said walls and concentric with said shaft, one kind of said sections having each a fluted concave solid grinding surface, assembled with another kind of said sections having each a sieve-like concave surface, a series of parallel disks within said casing and positioned upon said shaft, a plurality of individual fluted edge grinding surfaces integral with arms and symmetrically fulcrumed in groups upon said disks and adapted to coöperate with said grinding sections to disintegrate material fed therebetween, said individual grinding surfaces being curved and divergent to said sections, means upon said disks contacting the otherwise free inner ends of said arms for adjustably governing the outward movement of said individual surfaces, means for feeding material to the device, means for governing the discharge of the disintegrated product.

10. A disintegrating machine, provided with an internal abrasive cylindrical partition, a rotating element therein, a plurality of individual devices fulcrumed upon said rotating element, said devices having their outer ends each formed into an abrasive surface curved divergent to said partition, means upon said rotating element adapted to contact the otherwise free inner ends of said devices, to limit the outward movement of said devices.

11. In a machine of the class described, a grinding chamber having a concave abrasive face, a revoluble element operating therein, and a grinding member pivotally mounted on said revoluble member and adapted to coöperate with the abrasive face of the grinding chamber; said grinding member having an abrasive face diverging from its pivotal mounting toward the abrasive face of the grinding chamber and provided with flutings transverse of its line of operative movement.

12. In a grinding machine the combination of a grinding chamber having a concave abrasive face, a revoluble member, a grinding shoe pivotally mounted on the revoluble member and having a rearwardly curved broad grinding face adapted to coöperate with the abrasive face of the chamber, and means for varying the limit of movement of said shoe toward the said abrasive face of the chamber.

13. In a grinding machine, in combination, a receptacle having a concave abrasive inner face, a revoluble member, a grinding shoe pivotally mounted on the revoluble member and having a rearwardly curved grinding face adapted to coöperate with the abrasive face of the receptacle, and a stop variably adjustable to vary the limit of outward movement of the grinding shoe.

14. In a grinding machine, in combination, a cylindrical receptacle having a concave abrasive inner face, a rotatable member, a grinding shoe pivotally mounted on the rotatable member and having a rearwardly curved grinding face adapted to coöperate with the abrasive face of the receptacle, and a selectively adjustable stop whereby outward movement of the grinding shoe is adjustably limited.

In testimony whereof, I have signed my name to this specification, in presence of two subscribing witnesses.

FREDRICK L. KINSEY.

Witnesses:
N. E. Brockman,
James L. Hopkins.